United States Patent
Senior

(10) Patent No.: US 6,400,836 B2
(45) Date of Patent: *Jun. 4, 2002

(54) COMBINED FINGERPRINT ACQUISITION AND CONTROL DEVICE

(75) Inventor: Andrew William Senior, White Plains, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,322

(22) Filed: May 15, 1998

(51) Int. Cl.[7] ................................................. G06K 9/00
(52) U.S. Cl. ...................................... 382/124; 382/115
(58) Field of Search ........................... 382/115–119, 124, 382/125, 126; 347/173–178; 713/182–186

(56) References Cited

U.S. PATENT DOCUMENTS

| | | |
|---|---|---|
| 4,151,512 A | 4/1979 | Riganati et al. |
| 4,310,827 A | 1/1982 | Asai |
| 4,817,183 A | 3/1989 | Sparrow |
| 5,140,642 A | 8/1992 | Hsu et al. |
| 5,852,670 A * | 12/1998 | Setlak et al. ................. 382/126 |
| 5,892,824 A * | 4/1999 | Beatson et al. ............. 713/186 |

FOREIGN PATENT DOCUMENTS

JP 04158434 * 6/1992

* cited by examiner

Primary Examiner—Joseph Mancuso
Assistant Examiner—Vikkram Bali
(74) Attorney, Agent, or Firm—Louis J. Percello

(57) ABSTRACT

The present invention combines the functionality of a computer pointing device with a fingerprint authentication system. In the preferred embodiment, by regularly scanning fingerprints acquired from the pointing device touch pad, fingerprint features may be extracted and compared to stored data on authorized users for passive authentication. Furthermore, calculations based upon the acquired fingerprint images and associated features allows the system to determine six degrees of freedom of the finger, allowing the user to control a variety of functions or to manipulate a three-dimensional model or virtual reality system.

53 Claims, 4 Drawing Sheets

COMBINED FINGERPRINT ACQUISITION AND CONTROL DEVICE

FIELD OF THE INVENTION

This invention relates to the field of computer input devices, and more particularly to pointing devices and fingerprint acquisition devices.

BACKGROUND OF THE INVENTION

Fingerprint matching is a well-established and reliable method of identifying individuals. As such, it provides a good method for authentication of the identity of a person for such purposes as enabling use of equipment, access to data, and the authorization of transactions. In recent years, powerful processors and new algorithms, coupled with a variety of new, "livescan" fingerprint scanning devices, have enabled the automatic verification of fingerprints on small computer platforms.

The incorporation of such authentication devices would be particularly useful for notebook, laptop and other portable, mobile computers. Mobile computers are more likely than desktop computers to be present in unsecured areas where unauthorized individuals might attempt to use or access the computer. Because users of such mobile computers often have confidential or proprietary information stored in these computers, such users have a strong interest in maintaining the security of their computers.

Nevertheless, prior security systems for such computers require intentional, active intervention by the user, such as entering passwords or using keylocks. The inconvenience of such frequent activity, in conjunction with the user's fears of misplacing or forgetting the key or password, often result in users ignoring available security systems.

At the same time, most common computer operating systems presently incorporate windowing in presenting information to users. Common examples of such software, often referred to as graphical user interfaces (GUIs), include Microsoft Corporation's Windows series and Apple Corporation's Mac OS. In such computer systems, a spatial metaphor is used to present information.

Some kind of pointing device is almost indispensable for the use of such a computer interface. Beginning with the mouse, a wide variety of pointing devices have been introduced, including trackballs, touchpads, and a variety of mechanical pointers. An example of such a pointing device is described in U.S. Pat. No. 5,489,900 by Cali et al, "Force Sensitive Transducer for Use in a Computer Keyboard."

Such pointing devices which are alternative to the mouse are especially desirable for use with mobile computers. The users of such mobile computers often do not have available the large, flat space necessary for operating the traditional mouse.

Hence, a flood of pointing devices has been introduced in recent years, adapted for use with mobile computers. Each such device has advantages and disadvantages, allowing for a range of alternatives which may be adapted to a variety of usage scenarios and personal preferences.

It would therefore be desirable to provide a fingerprint authentication device capable of allowing user pointing, one which is compact enough for incorporation into a mobile computer. Such a device would allow for user authentication without separate, active intervention by the user.

SUMMARY OF THE INVENTION

It is therefore an object of the present invention to provide a combined fingerprint scanner and pointing device. Such a device has the natural advantages of requiring less volume, mass and external surface area than two separate devices, and would cost less and be simpler to incorporate into space restricted systems, such as mobile computers.

Hence, a system is provided according to the present invention for imaging a fingerprint for input of pointing information for a computer. The system includes a fingerprint image acquisition scanner for acquiring a fingerprint image of a finger. The system also includes an image processor for extracting from the fingerprint image at least one contact parameter in addition to authentication status data for the fingerprint image. Such contact parameters may include the two dimensional spatial location of the fingerprint on the scanner, as well as estimates for the force applied by the finger or the rotational orientation of the finger.

In addition to providing the capabilities of a simple pointing device and an ordinary fingerprint scanner, the combination of the two functions into a single system has a number of useful advantages not seen in either single-purpose device. Incorporating the pointing device functionality allows the fingerprint to be passively acquired, without requiring repeated explicit authentication which could take time and interrupt work flow. Thus, the system according to the present invention can operate as a continuously functioning 'dead hand' authentication device.

The system, or the attached computer, could maintain a flag which contains data indicating the present authentication. The flag can be made to expire under a variety of conditions, including upon powering down the computer, after passage of a predefined time interval, if a predetermined high value transaction is initiated, etc. On expiration of the flag, the user could be prompted to present a finger for imaging. However, during normal usage of the system, the image obtained during normal pointing or other data input operations could be used for authentication and used to reset the authentication flag.

As a pointing device, the only output required is usually only a simple two dimensional (x,y) coordinate. Such a coordinate can be calculated in a variety of ways. The system according to the presently preferred embodiment calculates the center of area of all of the "on"-pixels of the acquired fingerprint image. The computed coordinates could be used directly in a computer interface as an absolute coordinate, in a manner similar to a computer tablet. In the alternative, the coordinates could be computed such that changes over time could be calculated and integrated, in a manner similar to that commonly used with a mouse.

Furthermore, other information can be extracted from the fingerprint image. In particular, one could calculate the total number of "on"-pixels above a given threshold and use this calculated value as an indicator of the force applied by the finger. Thus a third degree of freedom may be calculated. This third parameter could be used to control the third axis in a three-dimensional graphical user interface or application, or could be used to control an independent variable, such as a scroll bar, sound intensity, etc. Other information that may be calculated as control variables include the second moment of area, the orientation of the principal axis of the fingerprint, and the relative lengths of the major and minor axes.

With more sophisticated algorithms, related to those used for image pattern recognition, it is also possible to work out which part of a finger is in contact with the scanner. This information can also be used for control, most simply as two directions of rotation. It can thus be seen that using the absolute position, force, rotation in the plane of the scanner, and rolling the finger to bring different parts of the skin into contact with the scanner, that six degrees of freedom can be generated, which intuitively correspond to the six degrees of freedom of a rigid body in three-dimensional space. This provides a very natural method of interaction with a three dimensional simulation, such as a virtual world.

DETAILED DESCRIPTION OF THE INVENTION

The presently preferred embodiment of the present invention comprises an apparatus for acquiring an image of a fingerprint, and associated image processing circuitry needed to derive from that image parameters characterizing the identity of the fingerprint as well as information usable as input to a computer. Such information would allow for simultaneous fingerprint identification and computer interface visual pointer control.

Figure 1:
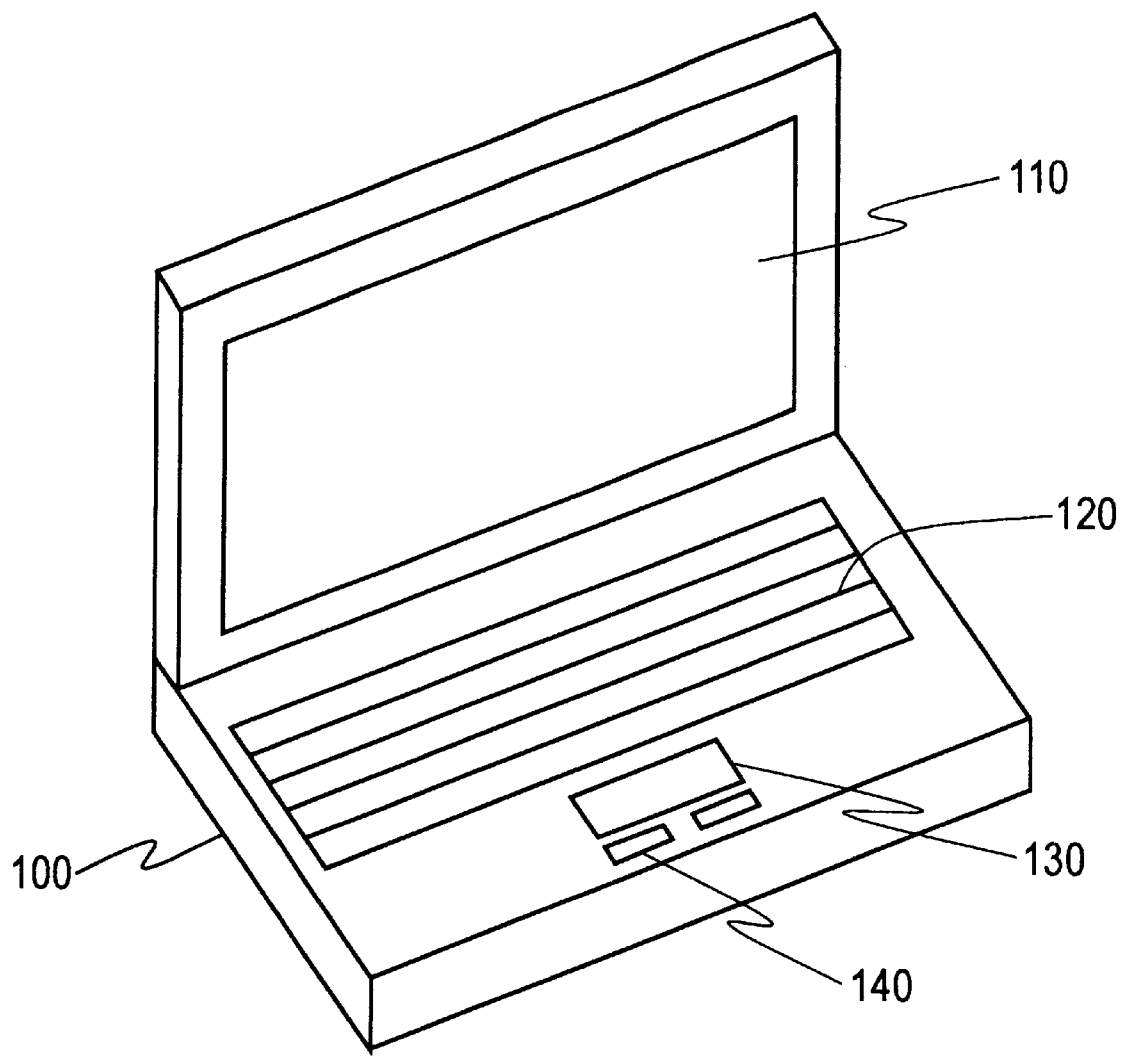
FIG. 1 is a perspective illustration of a mobile computer 100 incorporating a combined fingerprint image scanner and pointing device according to the present invention.

FIG. 1 shows a mobile computer 100, having a screen 110 and a keyboard 120. Mobile computer 100 is shown with a combined fingerprint scanner and pointing scanner 130 according to the present invention. A pair of optional control buttons 140 are also shown. Control buttons 140 may be used, for example, as substitutes for the buttons of a mouse. It should be noted that mobile computer 100 could be programmed to recognize a corresponding predetermined series of finger taps of short duration as representing the same functions as depressing each optional control button 140, whether or not optional control buttons 140 are present.

The preferred embodiment of the invention uses a compact, thin, flat scanner 130. The presently preferred choice of such a scanner 130 is that of a semiconductor fingerprint sensor, such as that described by Taikoe in U.S. Pat. No. 4,353,056. While such a semiconductor scanner 130 is presently preferred for use in conjunction with mobile computers, a wide variety of choices of mechanisms for fingerprint acquisition by scanner 130 may be used in accordance with the present invention. Optical scanning may be used either by frustrated total internal reflection, holographic elements or by conventional reflected light imaging. Similarly, a variety of electrical or electromagnetic scanners, semiconductor or otherwise, may be used, which utilize either capacitive or inductive scanning. Ultrasound imaging of the fingerprint might also be used. The present invention is compatible with any choice of fingerprint scanners which permit digital acquisition or interpretation of the fingerprint image.

The preferred embodiment of the present invention would require a scanner 130 several times larger than that of currently available semiconductor fingerprint scanners, to allow enough motion of the finger to allow control pointing functions. Such currently available semiconductor fingerprint scanners are sized solely for static presentation of fingerprints for authentication scanning purposes.

Figure 2:
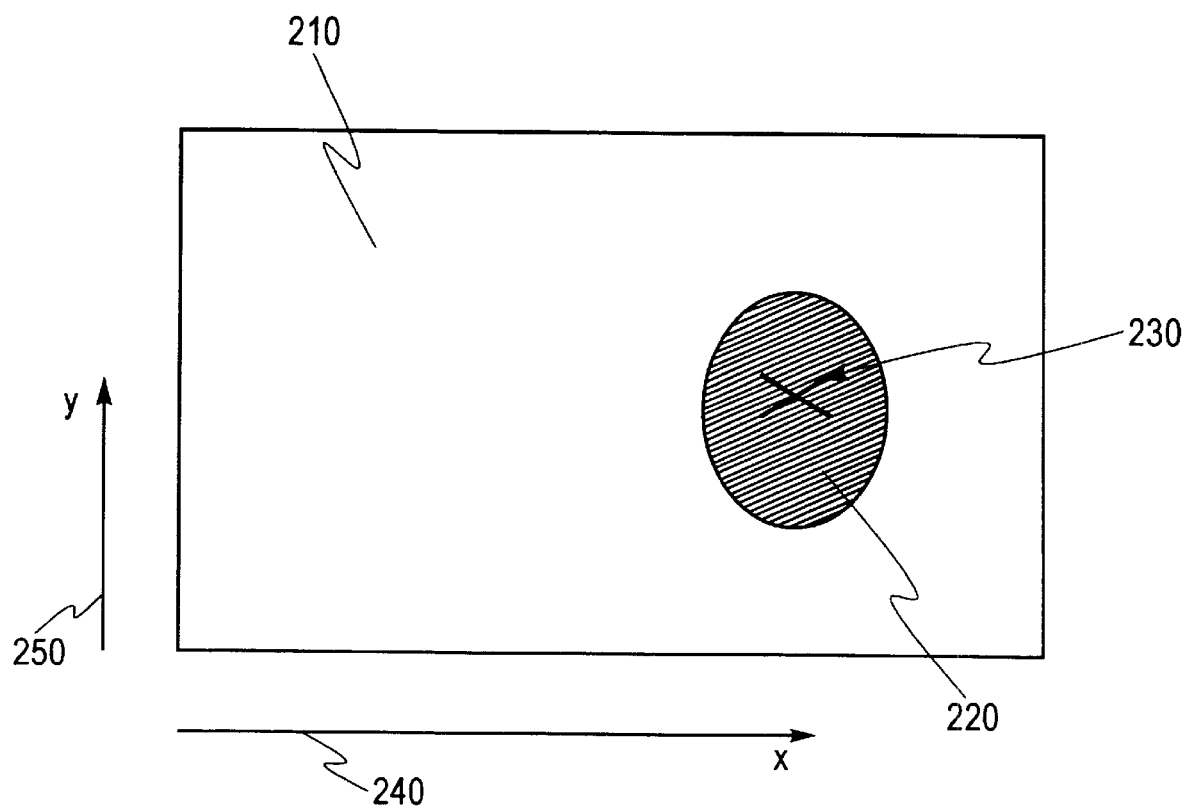
FIG. 2 is an illustration of the usable fingerprint scanner surface 210 of scanner 130 of FIG. 1.

The need for such a larger scanner 130 is best understood relative to FIG. 2. FIG. 2 shows a diagram of a fingerprint scanner surface 210 with an acquired fingerprint image 220. Fingerprint scanner surface 210 corresponds to the functional area of scanner 130. The portion of the surface area of scanner 130 which comprises scanner surface 210 depends upon the functional characteristics of scanner 130, which may vary dependent upon the image acquisition method employed by scanner 130.

The presently preferred embodiment of the present invention calculates a center-of-area or centroid 230 of fingerprint image 220. Centroid 230 has an associated two dimensional coordinate relative fingerprint scanner surface 210, which in FIG. 2 is represented as an x-coordinate 240 and a y-coordinate 250. The choice of coordinate systems is arbitrary, and may be chosen to facilitate computations related to the specific or general application of the device according to the present invention.

Having calculated a coordinate pair representative of fingerprint image 220, this coordinate pair allows scanner 130 to be used as a two-dimensional pointing device, in manners well known in the prior art. For example, the coordinate of the scanner may be remapped to screen coordinates, so that the absolute finger position on scanner 130 relative to scanner surface 210 corresponds to an absolute screen position, just as with an electronic pen tablet. With such a remapping implementation, it is preferable to allow a margin of about half of a finger's width, mapping the area within such a margin to the screen area, to allow the user to easily point to any position on the screen with the centroid 230 of fingerprint image 220.

Alternatively, any movement of the finger in contact with scanner 130 would continuously change successive coordinates of centroid 230, allowing calculation of relative motion of acquired fingerprint images 220. This relative motion may be remapped to the motion of the cursor on the screen, in a manner similar in operation to that of a mouse.

Such methods of computation of such absolute and relative location of a pointer or cursor on a screen are well known in the prior art, and are consistent with the present invention. All such methods, however, would require room for the motion of the user's finger across scanner 130; hence, the need for a surface area larger than that of many currently available fingerprint scanners.

Figure 3:
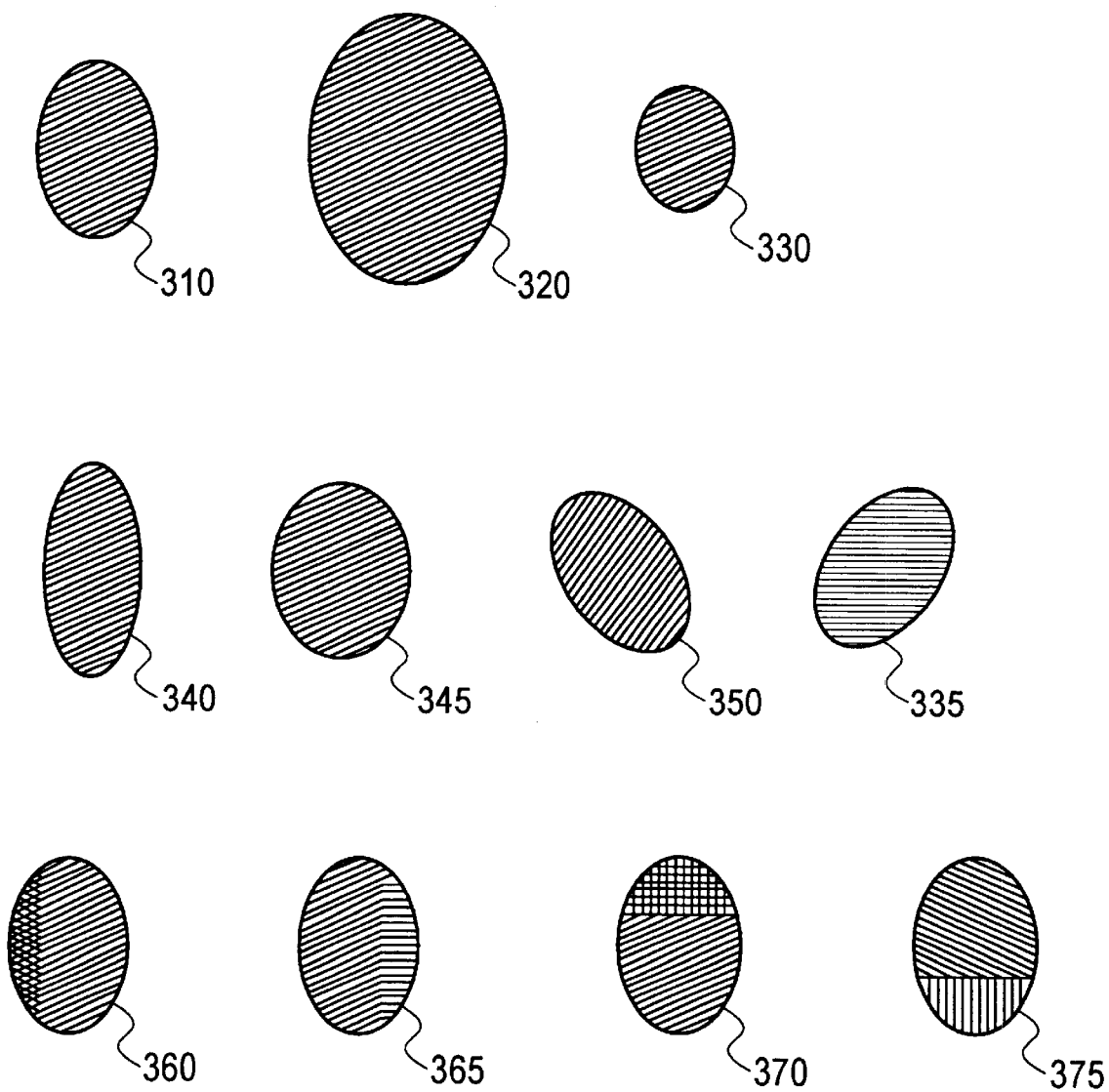
FIG. 3 illustrates a series of acquired fingerprint images 220 of FIG. 2, corresponding to variations in the overall fingerprint image controlled by the used and interpreted as control signals for the computer.

FIG. 3 shows a variety of fingerprint images 220 which may be acquired by scanner 130. These images are abstracted as shaded ellipses. The area of the ellipse represents those image pixels which are "on" or active in the corresponding fingerprint image 220. "On" may mean either a value above that of the background threshold, or a value greater than some other predetermined threshold, e.g., to permit a desired margin of error or to represent a standard background level, thereby obviating the need for determining the background for each scan. The separate images 310–375 represent variations in the overall fingerprint image controllable by the user and interpreted by the present invention as control signals for computer 100.

As the force applied by the finger increases, the image size will increase. Image 310 represents a fingerprint with a typical force. Image 320 represents the same finger pressing with a greater force, hence increasing the area of the image relative to image 310. Image 330 represents the same finger pressing with lesser force, hence decreasing the area of the image relative to image 310. Hence, a number representing the force applied by the finger may be estimated by computing the area of fingerprint 220 in contact with scanner 130.

One method for estimating the surface area of fingerprint 220 is to count the number of image pixels with a value above the background threshold in the image, with those image pixels having values below the threshold being treated as noise. Another method would be to find the sum of the intensities of the "on" pixels above a threshold value. A variety of such calculation techniques are known in the prior art for image acquisition and pattern recognition.

To enhance the quality of the estimates, a number of image processing operations may be carried out on the fingerprint image before calculating the control parameters. In particular, a dilation operator might be applied to the image to join the ridge images into a solid area, and filling small holes in the ridge images. This could be followed by an erosion operator to remove small regions away from the finger area caused by noise, dirt on the scanner, or any other process whose effects are desired to be ignored.

Any raw measure of force, such as those described above, could be rescaled by the application of a monotonic function to give a more meaningful measure. This force/area measurement could be passed to the computer software as a control parameter. With appropriate software on computer 100, the parameter could control a third dimension, such as in a three-dimensional model. Alternatively, such a control parameter could control scrolling of a window. A wide variety of uses of a third control parameter are well known in the prior art.

Placing the finger on scanner 130 rotated in the plane of scanner 130 will give different images, such as image 350 (counter-clockwise) or image 355 (clockwise). This rotation can be calculated, for example, by finding the covariance of the image pixels above a threshold, possibly weighted by their intensities, and deriving the orientation of the principal axis of the image. This principal components analysis is well known to those skilled in the art. Other methods which may be applied to the estimation of the finger rotation are also well known, one of which is described below regarding fingerprint feature extraction.

Rolling the finger from side-to-side, i.e. rotation about the axis of the finger, brings different areas of skin into contact with scanner 130. Image 360 shows skin from the left side of the finger (indicated by a cross-hatched area, as opposed to the diagonally striped area indicative of the central area of skin) touching scanner 130. Similarly, image 365 shows skin from the right side of the finger (indicated by a horizontally-striped area) touching scanner 130, caused by rotating the finger opposite to that causing image 360.

Rotating about a third axis, parallel to the axis of the knuckle joints, so that the finger points more or less perpendicular to the plane of the scanner, will bring about similar variations. Image 370 shows more of the skin closer to the nail (shown as a checked area) touching scanner 130, while image 375 shows more of the skin closer to the knuckle (shown as a vertically striped area) touching scanner 130. Calculating the orientation of the finger from this information is more complex than computing the area, principal axes or planar rotation of the print, but may be found by methods commonly employed in most fingerprint matching algorithms.

In the preferred embodiment of the present invention, the fingerprint feature extraction and matching software calculates a correspondence between fingerprint features on the acquired fingerprint and a stored model. In particular, an overall angle of rotation is part of that correspondence. The angle of rotation of the correspondence transformation gives an alternative estimate for the rotation in the plane (images 350 and 355). This method is more reliable, but more computationally expensive than that described above regarding images 350 and 355, and if absolute, not relative, rotation is needed, this method requires a registration print with known rotation to be provided before use.

The positions of the fingerprint features relative to some fiducial point in the print, such as centroid 230 described above, will vary with the spatial orientation of the finger. For instance a minutia (a feature of a fingerprint used for identification) normally found near centroid 230 of the contact area with the finger directly over scanner 130, would be close to the bottom of fingerprint image 220 if the finger were rolled forward, or to the right if the finger were rolled to the left. Using several of these features and combining the rotation estimates will provide a robust estimate of the average feature displacement. Displacement in the direction of the finger axis can be interpreted as rotation about an axis parallel to the knuckle articulations, as in images 370 and 375, and orthogonal displacements can be interpreted as rotations about the finger axis, as in images 360 and 365. Thus, an estimate of the finger rotation about all three axes can be obtained.

Therefore it is possible from fingerprint image 220 to generate data regarding six degrees of freedom (the finger "pose"). These six degrees of freedom correspond to the six degrees of freedom of a rigid body in space. The x and y coordinates correspond to the centroid position, the z coordinate corresponds to the force estimate, and the pitch, roll and yaw are derived as described directly above for the three axes of rotation. However, because the finger is not totally free to move in space, because it is constrained by connection to the hand, many values of pitch, roll and yaw are difficult to present to the scanner, or would give no image. This may be compensated for by generating scaled up values from the easily producable ranges, or by using an integration of relative movements, again similar to a mouse's functionality, much like the methods discussed above regarding the two dimensional location of a cursor on a screen.

Hence, scanner 130 according to the present invention would permit a user to provide information corresponding to all six degrees of freedom of a rigid body. This information could be used in a variety of three-dimensional and virtual reality applications. However, scanner 130 may easily be used for purely two dimensional applications, such as directing a cursor on a computer screen.

It should be noted that some users may be able to control the aspect ration of the ellipse, making it narrower as in image 340 or wider as in image 345. Such parameters may be estimated from fingerprint image 220 by principal components analysis.

Also, if a second finger is placed in contact with scanner 130, another area of "on" pixels will be present in the image. This can easily be detected using methods common in the prior art, and a second set of pose parameters extracted. A complete second set of control parameters may be extracted, thus giving many more degrees of freedom, and the possibility of detection of taps of the second finger, equivalent to mouse button clicks. These parameters could be used to control a second 3-dimensional object or viewpoint, or a second application, or could be used in parallel with the first finger. For instance, the first finger could be used for pointing, and the second finger could be used to provide control button functionality.

Alternatively, the present invention may filter out secondary fingerprint images 220 as spurious if the application warrants, to prevent false readings by accidental brushing of scanner 130 by other fingers.

While the user's independent control of more than two fingers is very limited, up to ten fingers could be placed in contact with the scanner, and additional control parameters could be derived from them. For instance, if the user is controlling the relative and absolute positions of five objects in two dimensions, the positions of the tips of the five fingers could be tracked and used as control parameters for the objects. Another example would be that of interpreting tapping one finger down next to the 'pointing' finger, which could be considered to be equivalent to a single mouse button click. However, tapping two fingers down could be interpreted as a double click.

Although the present invention is of obvious usefulness as a pointer for a graphically-based computer interface or other computer application, the system incorporates both the control device functionality as well as fingerprint authentication.

Figure 4:
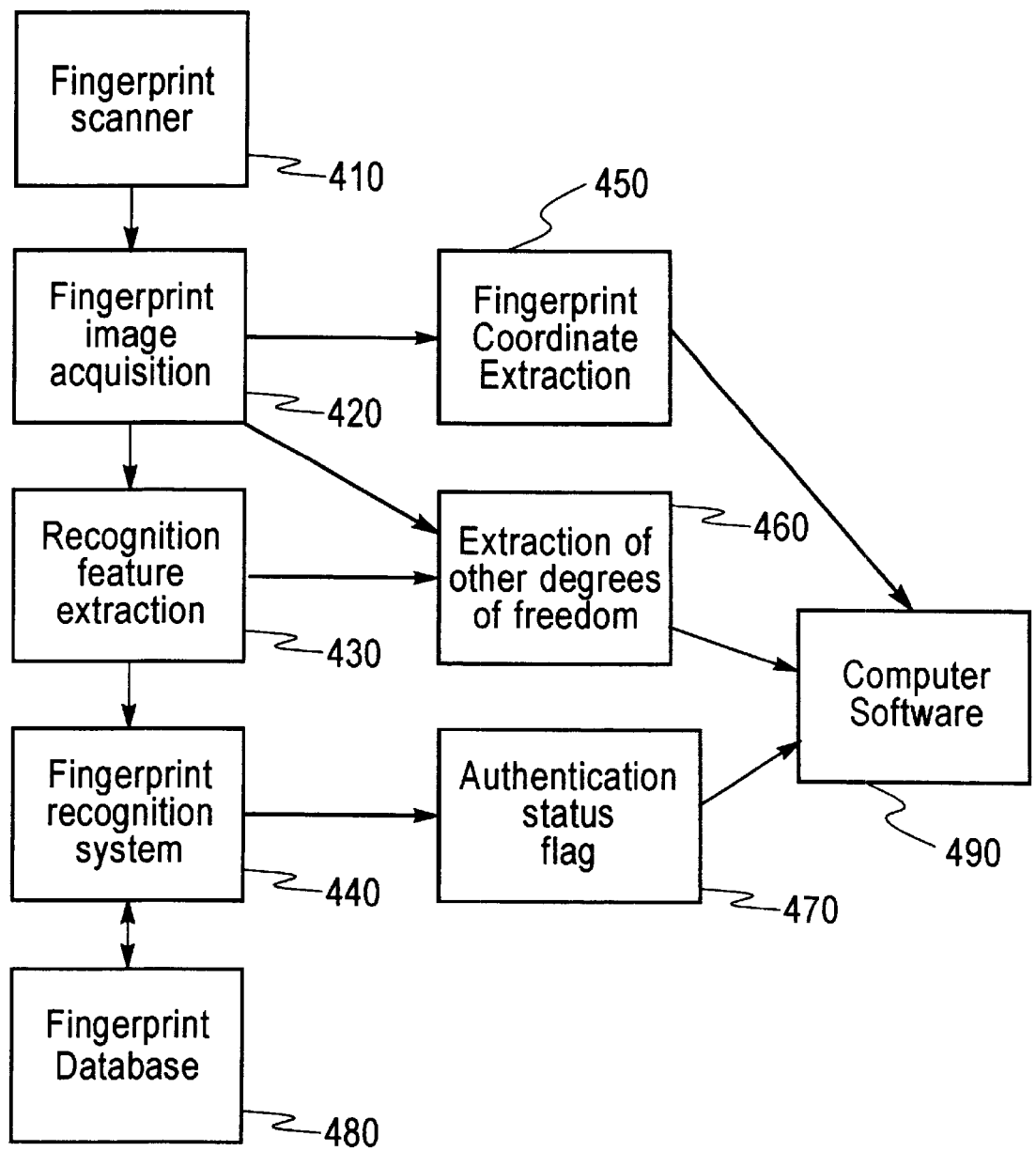
FIG. 4 is a flow diagram of the operation of scanner 130 for control of software on computer 100 of FIG. 1.

An overview of the operation of the present invention may be seen from the flow diagram of FIG. 4. An image of the fingerprint, such as fingerprint image 220, is scanned at 410. The scanned fingerprint image data would then be saved or transmitted for fingerprint image acquisition at 420.

This process of scanning and acquiring fingerprint images could function in one of several ways. First, the fingerprint image scanning 410 could be a continuous scan of the fingerprint image, with the fingerprint image scanner outputting the fingerprint images as a streaming video signal or other continuous encoded signal. In such a case, the fingerprint image would be acquired at 420 by a frame grabber or other hardware designed to obtain discrete time samples of video. Such a frame grabber would store a representation of the fingerprint image only at those times when the system is prepared to process the image data.

Alternatively, the fingerprint image scanner itself may only scan the fingerprint image at those times when the system is prepared to process the image data. In such a case the steps of fingerprint image scanning 410 and fingerprint image acquisition are linked and are performed simultaneously. The fingerprint image would be scanned at 410 and then immediately stored in a dynamically accessible memory, either within the system or in computer 100 itself.

It should be noted that in either approach to fingerprint image scan and acquisition described above, that image scanning and image acquisition may be performed by a single unit, connected units, or by a combination of units with computer 100. In addition, other methods of scanning and acquiring the fingerprint image data may become obvious to those skilled in the art, and may be used in accordance with the present invention.

A variety of interconnected steps may be performed next, as shown in FIG. 4 as steps 430 to 480, to be described in detail below.

For the system to be used as a simple pointing device, the step of extracting the fingerprint coordinate at 450 is essential. This extraction may be accomplished in a variety of ways. One method would be to find the weighted center-of-area or centroid 230 of fingerprint image 220, as described above. Again, a variety of methods of obtaining a coordinate value for the fingerprint image 220 will be obvious or known to those skilled in the art of the present invention.

The acquired fingerprint image may also be processed by a feature extraction program at 430, which extracts common fingerprint features such as minutae. The data regarding these features may be used either to extract information regarding other degrees of freedom of the finger imaged, as described above, or in fingerprint authentication. The methods of extracting such information is well known in the art by those skilled in the art of the present invention.

The calculation of information related to such additional degrees of freedom of the imaged finger is performed at 460. Such calculations may be made either solely from the fingerprint image acquired at 420, or in conjunction with fingerprint features recognized at 430. A variety of methods for performing such calculations are described in detail above, or are well known by, or obvious to, those skilled in the art of the present invention.

The remaining steps 440, 470 and 480 of FIG. 4 relate to the fingerprint authentication function of the present invention. As mentioned above, since the finger is repeatedly in touch with scanner 130 during the normal operation of the computer, the fingerprint can be scanned whenever a pointing operation is carried out, and its identity determined or verified using fingerprint authentication system as described herein. Thus, any operation that may only be performed by an authorized user may be automatically authorized by verifying the fingerprint captured at the time of the pointing action initiating the operation. This system is similar in operation to that described by Fitzpatrick et al. in U.S. Pat. No. 5,420,936, "Method and Apparatus for Accessing Touch Screen Desktop Objects via Fingerprint Operation," which is incorporated herein by reference.

The general operation of the authentication process may be understood in terms of the following overview. This process is provided as an example of the presently preferred embodiment of the present invention. Alternative processes for providing the same result will be obvious to those skilled in the art of the present invention.

A fingerprint image acquired at 420 whose features are extracted at 430 is then compared with stored fingerprint characteristics of authorized users by a fingerprint recognition system at step 440.

Stored fingerprint characteristics are maintained in a database and accessed at step 480. The process of retrieving this stored data may be performed in a variety of manners, including transferring relevant data at power-up of computer 100, input in the fingerprint recognition system of a new set of fingerprint features, and a number of other alternatives which will be obvious to those skilled in the art of the present invention. The key requirement of step 480 is that relevant fingerprint data is provided to the fingerprint recognition system at step 440 so as to be available when authentication is to be performed.

The fingerprint recognition process at step 440 results in a determination that the fingerprint either matches those stored for the authorized user, or fails either because of a mismatch or incomplete fingerprint. The results may be expressed as a numerical value, which is assigned at step 470 as a status flag. The status flag, along with the finger coordinates extracted at steps 450 and 460, are transmitted to the relevant computer software at step 490. This transmission may be accomplished by an actual transmission of the data between scanner 130 and computer 100, if steps 420 through 480 are performed by a separate system, or by transfer of data within the software of computer 100, if those steps perform their various calculations using software resident in computer 100, as described below.

The manner of determining the authentication flag may vary depending upon the needs of the system and system software of computer 100. For example, in practice not all restricted operations will be initiated through the pointing device. In such cases, the computer system may require a separate authentication step, with computer 100 prompting the user to present the finger to the scanner for a good quality, verifiable print which can be verified to authorize the use of the operation. A similar process could be required where the passively acquired fingerprint is of poor quality and hence cannot be verified because insufficient features are extracted.

Another authorization method would have the authentication flag set for an long or indefinite period, once an initial authentication is obtained, thereby allowing secure transactions to be performed without further authentication. For example, the flag can be designed to be automatically unset after a given period of time, or after any of a variety of other criteria are met. Examples of such criteria might be initiation of a high value transaction, or the execution of a sequence of out-of-the-ordinary transactions, which may raise reasonable suspicions that the operator is not the authorized operator.

In any of the above cases where the authentication flag is unset, the flag may be reset by the finger being presented for authentication, either passively, as described above, or actively, by computer 100 prompting the user to present the finger for authentication. If verified, the flag is set again, and the timeout period and other status indicators reset. Thus, during normal operation, the flag may be continuously or periodically reset without the user being prompted to present the finger for authentication, ensuring a high level of security is maintained without interrupting the operator's work flow. If ever a high quality fingerprint is obtained that does not match an authorized user, the authentication flag can be immediately unset and the operation of computer 100 suspended.

A wide variety of more complex schemes for timeouts and the setting and unsetting of one or more security flags, including the use of security flags with multiple values, perhaps representing, will be apparent to those skilled in the art of the present invention. Such additional values or flags might represent different levels of security, operations with higher standards of authentication, or varying levels of reliability of the match of the acquired fingerprint image with the stored authorized fingerprints. These alternatives will often be dictated by the requirements of the software of computer 100, and are fully in accordance with the present invention.

While the fingerprints are continuously being scanned, a complex fingerprint verification system could use the newly acquired print images to adapt its model of the correct print. This would allow the system to automatically adapt to the effects of aging or newly acquired creases and scars without the need for a new enrollment (training of the system to story authentication data).

In addition to constantly verifying that the user is an authorized user, the system can also be used to passively identify the operator in an environment where multiple people use the same electronic device and it is important to know which particular operator is using the device at a given time. One situation where this feature might be useful in a retail environment, where a number of sales representatives may use a specific point-of-sales terminal, but the person entering a given transaction must be identified. In this case a standard piece of fingerprint identification software could be combined with the device, and identification, security authorization and pointing could be carried out at the same time. However, a variety of applications and software configurations will become apparent to those skilled in the art.

It should be noted that any or all of the steps 430 to 480 described above may be carried out in a variety of ways. Fingerprint scanner 130 may contain separate image processing hardware for performing these steps. These steps may also be performed by software modules operating within computer 100 itself, using the central processing unit of computer 100 to perform the algorithms. Alternatively, the steps may be performed within computer 100 by additional hardware, either hardware already present or provided expressly for the purpose of performing these steps. For example, the algorithms may be run on specialized signal processing hardware, such as IBM Corporation's MWAVE processor, or the fingerprint database may be stored on a removable smart card or other data storage device.

It should also be noted that without loss of generality, whenever a threshold is mentioned above, that a system without a threshold is also implied, since this is equivalent to a system with a threshold set equal to zero.

One concern with the authentication function of the present invention is that some people may believe that such operations interfere with their privacy. For this reason, a preferred embodiment of the present invention would have a method of disabling the fingerprint reading function. For example, steps 440, 470 and 480 may be disabled without interfering with the operation scanner 130 of the present invention as a pointing device with six degrees of freedom. Furthermore, steps 430 and 460 may be disabled, leaving the operation of scanner 130 as a simple two-dimensional pointer, similar to a traditional touchpad. In such a case fingerprint image scanner 130 is disabled from obtaining minutae data for fingerprint image 220 while still obtaining overall shape and location data on fingerprint image 220.

The disabling feature could be achieved in a variety of ways. For example, if a single chip did the scanning and calculation of the fingerprint parameters, with a separate fingerprint recognition system performing the authentication, an external signal or switch, or software parameter in computer 100, could enable or disable transmission of acquired fingerprint image data by the scanning chip to the fingerprint recognition system. On some systems the device could be used solely as a pointing and control device, without a fingerprint recognition system being available. For example, computer 100 could be provided with an option to install the fingerprint recognition system as a hardware and/or software upgrade to a scanner 130 with the single chip described above. This would allow the manufacturer of computer 100 to design a single model which provides the option of providing either a lower cost system without authentication and a premium system with such authentication.

While the present invention has been described with respect to a mobile computer 100, clearly it may be adapted for use in other environments as well, which may utilize alternative image acquisition methods. Obviously, an image scanner may be incorporated into the keyboard, mouse or display of a desktop computer or computer terminal. Additional alternative applications could include any graphical application where information or access is restricted based on user identity, such as bank ATMs, automatic ticketing systems, electronic cash registers, dedicated information kiosks, etc. Fingerprint data may be either contained in a database in the system itself, or in removable data storage devices such as smart cards. The wide variety of such applications will become apparent to those skilled in the art after review of the present invention.

There has been disclosed herein a system and method for combined fingerprint acquisition for user authentication and for acquiring control parameters for operation of a computer. Various modifications to the present invention will become apparent to those skilled in the art from the foregoing description and accompanying drawings. Accordingly, the present invention is to be limited solely by the scope of the following claims:

What is claimed is:

1. A system for imaging a fingerprint for input of pointing information for a computer, said system comprising:
   a fingerprint image acquisition scanner for acquiring a fingerprint image of a finger; and
   an image processor for extraction from said fingerprint image at least one contact parameter other than any optional authentication status data for said fingerprint image, wherein said image processor calculates which portion of the finger's surface is in contact with said scanner; and
   said image processor estimates the angular rotation of the finger in each of three directions from said calculation of which portion of the finger's surface is in contact with said scanner.

2. The system of claim 1, further comprising:
   a feature extraction processor for extracting representative features from said fingerprint image;
   a memory for storing representative features of at least one authorized user; and
   a feature comparison processor for comparing said stored representative features with said extracted representative features, and generating authentication status data therefrom.

3. The system of claim 2, wherein said feature comparison processor sets a security status flag when said acquired fingerprint image matches said stored representative features of one authorized user.

4. The system of claim 3 wherein said security status flag is unset after a predetermined time period since said security status flag was most recently set.

5. The system of claim 3 wherein said system repeatedly acquires fingerprint images and compares said stored representative features with said extracted representative features of said acquired fingerprint images during normal operation of the computer.

6. The system of claim 3 wherein said system unsets said security status flag when a predetermined security violation is detected.

7. The system of claim 3 further comprising a data transmission circuit for transmitting a command to the computer requesting a prompt to the user to present a finger for fingerprint acquisition when said feature comparison processor cannot accurately determine whether said extracted representative features match said stored representative features.

8. The system of claim 2 wherein said fingerprint image scanner may be disabled from obtaining minutae data for said fingerprint image while obtaining overall shape and location data on said fingerprint image.

9. The system of claim 2 wherein said feature comparison processor may be disabled by the software on the computer.

10. The system of claim 2 wherein the computer displays a representation of said authentication status data.

11. The system of claim 1 further comprising a data transmission circuit for transmitting contact parameter information to the computer.

12. The system of claim 11 wherein said contact parameter information is used by the computer for controlling the position of an on-screen cursor.

13. The system of claim 1 wherein said contact parameter comprises a spatial location coordinate.

14. The system of claim 1 wherein said contact parameter comprises a measure of force applied to said scanner by the finger.

15. The system of claim 14 wherein said image processor calculates said force by calculating a weighted sum of pixels comprising said fingerprint image.

16. The system of claim 1 wherein said system derives the angle of rotation of said fingerprint image from calculating the principal axis of the active pixels in said fingerprint image.

17. The system of claim 16 wherein said calculating the principal axis of the active pixels in said fingerprint image comprises comparison of said active pixels with a threshold value.

18. The system of claim 1 wherein said calculation of which portion of the finger's surface is in contact with said scanner comprises estimation by using a correspondence of fingerprint features.

19. The system of claim 2 wherein said image processor estimates six degrees of freedom from said acquired fingerprint image.

20. The system of claim 1 wherein the computer displays a derived representation of the acquired fingerprint image.

21. The system of claim 1 wherein the computer displays a representation of said at least one contact parameter.

22. The system of claim 1 further comprising a data transmission circuit for transmitting said at least one contact parameter to the computer for controlling software operating in the computer.

23. The system of claim 1 wherein said contact parameter comprises a status contact parameter indicating whether the finger is in contact with said fingerprint image scanner.

24. The system of claim 23 wherein a predetermined series of transitions of said status contact parameter is interpreted as equivalent to clicking a button on a mouse.

25. The system of claim 1 wherein the computer displays a representation of said fingerprint image.

26. The system of claim 1 wherein the three directions of angular rotation of the finger are pitch, roll and yaw.

27. A system for imaging a fingerprint for input of pointing information for a computer, said system comprising:
   a fingerprint image acquisition scanner for acquiring a fingerprint image of a finger; and
   an image processor for extracting from said acquired fingerprint image a two dimensional coordinate pair and a third coordinate representing the applied force of the finger, wherein said image processor further extracts three coordinates representing the rotation of the finger in each of three dimensions.

28. The system of claim 27 wherein said image processor extracts said third coordinate representing applied force of the finger by computing the area of said acquired fingerprint.

29. The system of claim 27 wherein the three directions of angular rotation of the finger are pitch, roll and yaw.

30. A system for imaging a fingerprint for input of pointing information for a computer, said system comprising:
   a fingerprint image acquisition scanner for acquiring a fingerprint image of a finger; and
   an image processor for extracting from said acquired fingerprint image parameters representing the six degrees of freedom of the finger, three of said six degrees of freedom being rotation in each of three directions.

31. The system of claim 30 further comprising a data transmission circuit for transmitting said parameters to the computer for controlling position and rotation in a three-dimensional model.

32. The system of claim 30 wherein rotation in three directions comprise a pitch, roll and yaw.

33. A method of imaging a fingerprint for input of pointing information for a computer, said method comprising:

a) acquiring a fingerprint image from an acquisition scanner for acquiring a fingerprint image of a finger;

b) processing said fingerprint image to extract from said fingerprint image at least one contact parameter other than any optional authentication status data for said fingerprint image;

c) calculating which portion of the finger's surface is in contact with said scanner; and d) estimating angular rotation of the finger in each of three directions from said calculating of which portion of the finger's surface is in contact with said scanner.

34. The method of claim 33, wherein said step of processing said fingerprint image further comprises:

c) extracting representative features from said fingerprint image;

d) storing representative features of at least one authorized user; and a) comparing said stored representative features with said extracted representative features.

35. The method of claim 34, wherein step f) further comprises setting a security status flag when said acquired fingerprint image matches said stored representative features of one authorized user.

36. The method of claim 35 wherein said security status flag is unset after a predetermined time period since said security status flag was most recently set.

37. The method of claim 36 wherein said system repeatedly performs steps a) through f) during normal operation of the computer, and unsets said security status flag when a predetermined security violation is detected.

38. The method of claim 35 further comprising:

g) transmitting a command to the computer requesting a prompt to the user to present a finger for fingerprint acquisition when said feature comparison processor cannot accurately determine whether said extracted representative features match said stored representative features.

39. The method of claim 34 wherein said stored representative features are adaptively changed to correspond to changes in the authorized user's fingerprint over time.

40. The system of claim 39 wherein said authentication data is provided to authorize an electronic transaction.

41. The method of claim 33 further comprising the step of transmitting said contact parameter to the computer.

42. The method of claim 41 wherein said contact parameter is used by the computer for controlling the position of an on-screen cursor.

43. The method of claim 33 wherein said contact parameter comprises a spatial location coordinate.

44. The method of claim 33 wherein said contact parameter comprises a force parameter representing the force applied to said scanner by the finger.

45. The method of claim 44 wherein said force parameter is obtained by calculating a weighted sum of pixels comprising said fingerprint image.

46. The method of claim 35 wherein said contact parameter is derived by calculating the principal axis of the active pixels in said fingerprint image.

47. The method of claim 46 wherein said calculating the principal axis of the active pixels in said fingerprint image comprises comparison of said active pixels with a threshold value.

48. The method of claim 33 further comprising calculating a surface parameter representing which portion of the finger's surface is in contact with said scanner.

49. The method of claim 48 wherein said surface parameter is calculated using a correspondence of fingerprint features.

50. The method of claim 33 wherein said step b) of processing said fingerprint image further comprises applying a dilation operator to said fingerprint image.

51. The method of claim 33 wherein said angular rotation of the finger in three directions comprises determining pitch, roll and yaw of the finger.

52. A system for authentication of the identity of a user of a data entry device, said system comprising:

a fingerprint image acquisition scanner for acquiring a fingerprint image of a finger;

an image processor for extracting from said fingerprint image at least one contact parameter other than any optional authentication status data for said fingerprint image; and a data transmission circuit for transmitting contact parameter information to the computer, wherein said image processor calculates which portion of the finger's surface is in contact with said scanner; and said image processor estimates the angular rotation of the finger in each of three directions from said calculation of which portion of the finger's surface is in contact with said scanner.

53. The system of claim 52, wherein the three directions of angular rotation correspond to pitch, roll and yaw.

* * * * *